Jan. 25, 1927.
C. E. SWENSON
1,615,317
UNIVERSAL JOINT
Filed Jan. 5, 1925
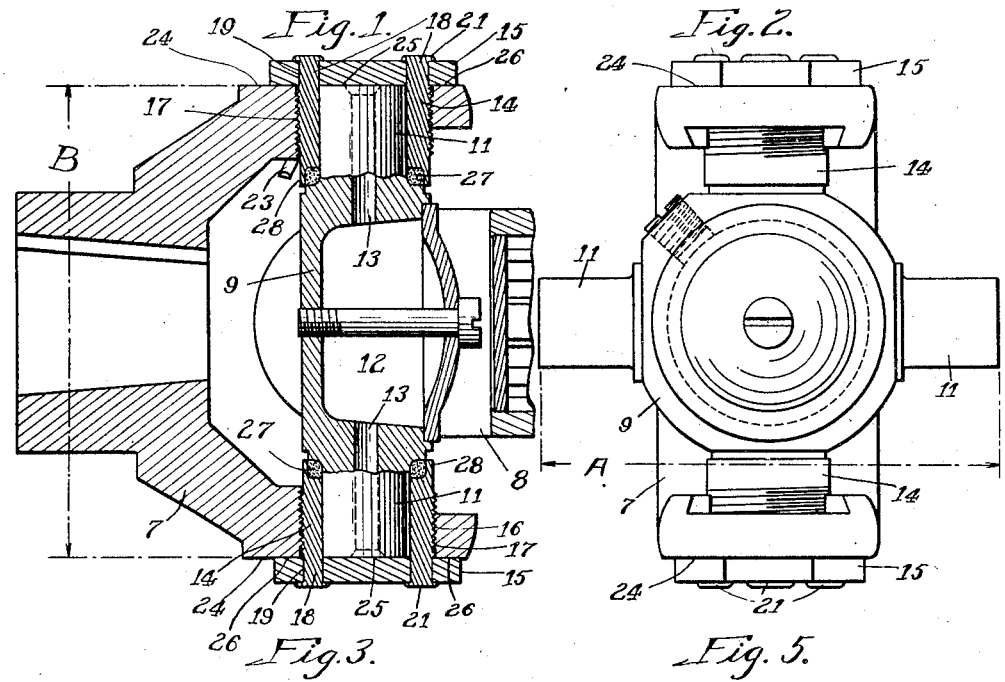
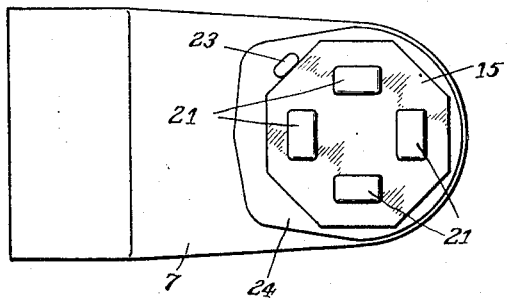
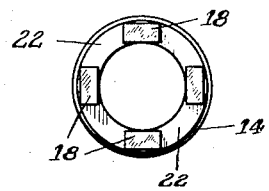
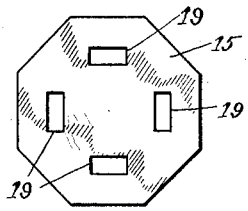
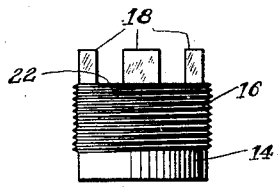
Inventor:
Carl E. Swenson
By Wilson & McKenna
Attys.

Patented Jan. 25, 1927.

1,615,317

UNITED STATES PATENT OFFICE.

CARL E. SWENSON, OF ROCKFORD, ILLINOIS, ASSIGNOR OF ONE-FOURTH TO CARL L. ANDERSON, ONE-FOURTH TO LEVIN FAUST, AND ONE-FOURTH TO ERIC S. EKSTROM, OF ROCKFORD, ILLINOIS.

UNIVERSAL JOINT.

Application filed January 5, 1925. Serial No. 486.

This invention relates to universal joints of the trunnion type.

The primary purpose of my invention is to improve the construction of the trunnion bearings and the connections thereof with their supporting parts, with the view to reducing the cost of manufacture thereof, securing greater accuracy in location of the end thrust bearing, and obtaining a structure in which a lubricant supply for the bearings will be retained without loss from leakage and which will be durable and long-lived without the necessity of adjustment.

The foregoing and other objects and attendant advantages will be appreciated by those skilled in this art as the invention becomes better understood by reference to the following description when considered in connection with the accompanying drawing, in which—

Figure 1, is a longitudinal sectional view through a universal joint embodying my invention;

Fig. 2, is an end view of the joint with one of the yokes removed;

Fig. 3, is an edge or top view of one of the yokes;

Fig. 4, is a face view of one of the end thrust bearing plates;

Fig. 5, is an end view of one of the radial bearing members; and

Fig. 6, is a side view thereof.

Inasmuch as my invention relates primarily to the construction and mounting of the means providing the radial and end thrust bearings for the trunnions, I have deemed it unnecessary to describe in detail the other parts of the joint. It will suffice to say that the joint is of the trunnion type and comprises, generally stated, a pair of terminal coupling members at present in the form of yokes 7 and 8 connected by a transmission member 9, known as a center cross, having quarteringly arranged trunnions 11 which are connected with the yokes through the agency of bearing members in accordance with my present invention. In this case continuous lubrication is provided for the trunnion bearings by a suitable oil contained in a reservoir 12 in the center cross 9 and delivered to the bearings through suitable ducts or channels 13. It should be understood that my invention is in no way confined to the particular form of universal joint shown in the drawing which is for purpose of illustration merely, but that it is applicable to any universal joint having trunnions or the equivalent.

According to my invention the bearings for each trunnion consist of a cylindrical member designated generally by 14 providing radial bearing for the trunnion and an end plate 15 providing an end thrust bearing for the trunnion. The parts 14 and 15 are assembled into a unit and then placed in position on the yokes when assembling the joint. Inasmuch as the construction of the units is identical a description of one will suffice.

In the preferred embodiment the member 14 is peripherally threaded as denoted by 16 so that it may be screwed into a threaded opening 17 in its respective yoke. This member may, however, be otherwise suitably secured in position, it being preferred that it be drawn or moved axially toward the center of the joint to a determined location as will be presently described. The outer end of the member 14 is cut away, preferably by milling operations to leave a plurality of projections 18. In this case four evenly spaced projections are provided, the sides of each projection or lug being preferably milled by said milling operations so that each projection has a substantially rectangular cross-section as shown plainly in Fig. 5. The end plate 15 may be a stamping perforated at 19 to fittingly receive the projections 18. The outer ends of these projections will be riveted or swaged over as at 21, or the projections may be welded, to rigidly and permanently secure and unite the parts 14 and 15, with the latter firmly seated against the shoulders 22. The end plate 15 is preferably, but not necessarily, of a form suitable to be gripped by a tool for turning the unit when screwing it into position, if this form of fastening means is employed. Suitable means such as a cotter pin 23 through the yoke arm may be employed for locking the trunnion bearing unit from displacement.

It will now be noted that in joints of this kind it is desired to maintain a determined dimensional tolerance between the ends of opposed trunnions denoted by dimension "A" (Fig. 2) and between the end thrust bearing faces provided by the bearing plates 15 denoted by the dimension "B" (Fig. 1), in order that the ends of the trunnions will properly fit and bear against the plate 15, to thereby secure the most effective end thrust bearings. To this end the opposed or aligned bearing trunnions are accurately finished at their ends to the dimension "A" as by passing them between opposed grinding wheels. The faces 24 at the ends of the yoke arms are likewise accurately finished to the dimension "B" with a dimensional difference of just sufficient to allow for an oil film between the end of each trunnion and its end thrust bearing surface 25. The inner side of the end plate 15 or in other words the side common to the surface 25 is accurately finished in a flat plane. Thus the end thrust bearing surface 25 is absolutely coplanar with the marginal face 26 of each plate 15. When the unit is assembled or brought to its final position on its supporting part the marginal face 26 by contact against the complemental face or seat 24 positively and accurately locates the end thrust bearing surface 25 coplanar with said face 24 and consequently in accurately determined relation to the ends of the trunnions. It will be manifest to those skilled in this art that the method of construction disclosed herein enables production of the parts at a comparatively low cost and that a high degree of accuracy and dimensional tolerance may be attained in a very practical and economical manner. This is especially desirable in the manufacture of universal-joints for the automotive industry, as is well known.

In the preferred embodiment of my invention a suitable packing 27 is interposed between the inner end of the member 14 and the transmission member 9 at the neck of the trunnion, the member 14 being grooved to receive the packing and to provide an outer wall 28 which confines and compresses the packing sufficiently to properly retain the latter. With this construction, however, the end or radial thrust from the joint is not transmitted through the packing but instead is carried wholly by the end thrust bearing at the outer end of the trunnion.

It is believed that the foregoing conveys a clear understanding of the objects prefaced above and while I have illustrated but a single working embodiment it should be understood that many changes might be made in details of construction in the application of my improvements to trunnion type joints different from the particular embodiment disclosed herein, without departing from the spirit and scope of the invention as expressed in the appended claims, in which—

I claim:

1. In a universal-joint, in combination with terminal coupling members and a transmission member having trunnions, of a trunnion-bearing connection between each trunnion and one of the terminal coupling members comprising a cylindrical bushing member to be received in said terminal member and providing radial bearing for the trunnion, and an end plate for the cylindrical member extending across the outer end thereof and beyond the sides thereof to provide a marginally projecting portion, the inner face of said plate being finished in a flat plane and providing both in one plane an end thrust bearing for the trunnion and a marginal locating face adapted to seat in flush engagement against the coupling member to accurately locate said end thrust bearing surface.

2. In a trunnion type universal-joint, in combination with coupling members and a transmission member, of trunnion connections between said coupling and transmission members, each comprising a cylindrical member providing radial bearing for the trunnion and being milled across its outer end to leave a plurality of projections, a perforated end plate adapted to receive said projections, said projections serving to secure the plate to said cylindrical member, the end plate providing an end thrust bearing for the trunnion and having a marginal locating face adapted to seat against its coupling member to accurately locate its end thrust bearing.

3. In a trunnion type universal-joint, a bearing unit for each trunnion comprising a member fixed with one of the terminal members of the joint and providing radial bearing for the trunnion, and an end plate fixedly located with respect to both the terminal member and the bearing member and providing on one flat side thereof an end thrust bearing for the trunnion and a locating face adapted to seat against the terminal member.

4. In a trunnion type universal-joint, a trunnion bearing unit comprising a cylindrical radial bearing member having projections on one end, and an end plate perforated to receive said projections, the projections serving to secure the end plate to the cylindrical member, the end plate providing an end thrust bearing surface for the trunnion and a marginal surface for locating said end thrust bearing surface with respect to the trunnion.

5. In a trunnion type universal-joint, a trunnion bearing unit comprising a cylindrical member providing a radial bearing for a trunnion and being milled across one end to provide a plurality of projections, an end plate perforated to receive said projections which serve to secure the end plate to the cylindrical member, the end plate providing an end thrust bearing for the trunnion.

6. In a trunnion type universal-joint, in combination, terminal coupling members, a transmission member, two pairs of opposed axially aligned trunnions connecting said members, the trunnions of each pair being finished at their ends to a determined dimension, a bearing unit for each trunnion adapted for connection to one of said members, each unit comprising a member providing a radial bearing for the trunnion and a flat finished face end plate for said radial bearing member providing an end thrust trunnion bearing and a marginal locating face, the member to which said unit is connected having seats for the locating faces, the seats for opposed trunnion units being finished to a determined dimension with respect to the dimension between the ends of said trunnions, whereby to accurately locate the end thrust bearings with respect to the ends of the trunnions.

7. A universal-joint comprising, in combination, a pair of yokes, a transmission member having quarteringly spaced trunnions the opposed pairs of which are in axial alignment, the ends of each opposed pair of trunnions being finished to a determined overall length dimension, the ends of each yoke being finished to a determined overall width dimension having a predetermined relation to the finished dimension of said trunnion ends, a bearing unit for each trunnion composed of a part providing radial bearing for each trunnion and a part for providing an end thrust bearing for the trunnion and having a marginal locating face adapted to seat against one of the finished faces of the yoke, and means for securing each unit with said last mentioned part fixed relative to said yoke and bearing and with its marginal face seated against the yoke.

8. In a trunnion type universal-joint, a bearing unit for each trunnion comprising a cylindrical member providing a radial bearing for the trunnion and having a plurality of projections at one end leaving intermediate shoulders, and an end plate perforated to receive said projections and being seated against said shoulders, the projections serving to secure the end plate to the cylindrical member, the end plate providing an end thrust bearing for the trunnion and a marginal locating face adapted for accurately locating said end thrust bearing with respect to the trunnion.

9. In a trunnion type universal joint, a bearing unit for each trunnion comprising a member having a radial bearing for the trunnion and a plurality of projections at one end and intermediate shoulders, and an end plate perforated to receive said projections and seat against said shoulders, the projections serving to secure the end plate to said member, the end plate providing an end thrust bearing for the trunnion and a marginal locating face adapted for accurately locating said end thrust bearing surface with respect to the trunnion.

CARL E. SWENSON.